(12) United States Patent
Matsumoto et al.

(10) Patent No.: US 10,669,876 B2
(45) Date of Patent: Jun. 2, 2020

(54) SEAL STRUCTURE AND TURBOMACHINE

(71) Applicant: Mitsubishi Hitachi Power Systems, Ltd., Yokohama-shi, Kanagawa (JP)

(72) Inventors: Kazuyuki Matsumoto, Tokyo (JP); Kenichi Fujikawa, Yokohama (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 73 days.

(21) Appl. No.: 16/079,242

(22) PCT Filed: Feb. 24, 2017

(86) PCT No.: PCT/JP2017/007028
§ 371 (c)(1),
(2) Date: Aug. 23, 2018

(87) PCT Pub. No.: WO2017/150365
PCT Pub. Date: Sep. 8, 2017

(65) Prior Publication Data
US 2019/0048735 A1 Feb. 14, 2019

(30) Foreign Application Priority Data
Feb. 29, 2016 (JP) .................................. 2016-038047

(51) Int. Cl.
*F01D 11/02* (2006.01)
*F01D 11/08* (2006.01)
*F02C 7/28* (2006.01)
*F16J 15/447* (2006.01)

(52) U.S. Cl.
CPC .............. *F01D 11/02* (2013.01); *F01D 11/08* (2013.01); *F02C 7/28* (2013.01); *F16J 15/447* (2013.01); *F05D 2240/11* (2013.01)

(58) Field of Classification Search
CPC ... F01D 11/02; F01D 11/08; F02C 7/28; F16J 15/447; F05D 2240/11
See application file for complete search history.

(56) References Cited

U.S. PATENT DOCUMENTS 5,632,598 A 5/1997 Maier
8,939,707 B1 * 1/2015 Lee ....................... F01D 11/122
415/1
(Continued)

FOREIGN PATENT DOCUMENTS

CN 104024581 A 9/2014
CN 104662305 A 5/2015
(Continued)

OTHER PUBLICATIONS

Office Action dated Sep. 30, 2019, issued in counterpart KR Application No. 10-2018-7024427, with English translation. (10 pages).
(Continued)

*Primary Examiner* — Igor Kershteyn
(74) *Attorney, Agent, or Firm* — Westerman, Hattori, Daniels & Adrian, LLP

(57) ABSTRACT

There is provided a seal structure to suppress a leak flow of a working fluid from a gap between a rotating structure and a stationary structure, the rotating structure being configured to rotate in a prescribed direction about an axial center line, the stationary structure facing an outer periphery of the rotating structure in a radial direction with the gap inbetween, wherein the stationary structure has a cavity in which the rotating structure is accommodated, an inner peripheral surface of the cavity is provided with a seal fin that extends toward the axial center line and a plurality of stationary-side recesses arranged along a flow direction of the leak flow, and as compared with a first stationary-side recess disposed on a most upstream side, a second stationary-side recess disposed on an immediately downstream side of the first stationary-side recess is set to have a smaller depth dimension.

16 Claims, 4 Drawing Sheets

(56) References Cited

U.S. PATENT DOCUMENTS

| | | | |
|---|---|---|---|
| 2012/0043728 A1* | 2/2012 | Zeng | F01D 11/001 277/412 |
| 2012/0121411 A1 | 5/2012 | Endo et al. | |
| 2012/0288360 A1 | 11/2012 | Kuwamura et al. | |
| 2013/0129493 A1* | 5/2013 | Matsumoto | F01D 11/001 415/191 |
| 2014/0154061 A1* | 6/2014 | Kuwamura | F01D 11/08 415/173.1 |
| 2014/0314579 A1 | 10/2014 | Kuwamura et al. | |
| 2015/0260294 A1 | 9/2015 | Nakaniwa et al. | |
| 2015/0369075 A1* | 12/2015 | Nishijima | F01D 11/02 415/168.1 |
| 2016/0047265 A1* | 2/2016 | Matsumoto | F01D 11/08 415/173.1 |
| 2016/0341058 A1 | 11/2016 | Nishikawa et al. | |
| 2017/0022838 A1 | 1/2017 | Kuwamura et al. | |

FOREIGN PATENT DOCUMENTS

| | | |
|---|---|---|
| JP | 2006-104952 A | 4/2006 |
| JP | 2011-208602 A | 10/2011 |
| JP | 2012-102831 A | 5/2012 |
| JP | 2013-76341 A | 4/2013 |
| JP | 2013-124554 A | 6/2013 |
| JP | 2015-108301 A | 6/2015 |
| JP | 2015-140916 A | 8/2015 |
| WO | 2014/077058 A1 | 5/2014 |
| WO | 2015/115558 A1 | 8/2015 |

OTHER PUBLICATIONS

Office Action dated Nov. 26, 2019, issued in counterpart JP Application No. 2016-038047, with English translation. (8 pages).

English translation of International Search Report dated Apr. 18, 2017, issued in counterpart International Application No. PCT/JP2017/007028 (2 pages).

English translation of Written Opinion dated Sep. 4, 2018, issued in counterpart Application No. PCT/JP2017/007028 (11 pages).

Office Action dated Jan. 8, 2020, issued in counterpart IN application No. 201817031374, with English translation. (6 pages).

Office Action dated Jan. 16, 2020, issued in counterpart CN application No. 201780013860.0, with English translation. (11 pages).

* cited by examiner

SEAL STRUCTURE AND TURBOMACHINE

TECHNICAL FIELD

The present invention relates to a seal structure capable of suppressing leakage of a working fluid between two relatively rotating structures, and a turbomachine using the same, which are suitable for suppressing unstable vibrations.

BACKGROUND ART

In a turbomachine such as a steam turbine, a gas turbine, and a turbo compressor, when a working fluid such as steam leaks through a gap formed between a stationary structure and a rotating structure, the leakage of the working fluid causes an efficiency loss (leak loss) in the turbine. Therefore, in order to prevent the leakage of the working fluid in the turbomachine, a seal structure is formed by providing seal fins in the gap (refer to Patent Literature 1, for example).

Furthermore, in the turbomachine, low frequency vibrations which are considered to be unstable vibrations may occur. When the unstable vibrations occur, malfunction is likely to occur, and therefore the turbomachine is demanded to be stopped. A seal excitation force is considered to be one of the major factors which cause the unstable vibrations. Regarding micro vibrations of the rotating structure occurring for some reasons, the seal excitation force acts on the rotating structure to promote whirling of the rotating structure and causes the unstable vibrations.

To describe the seal excitation force in detail, the working fluid flowing through the seal portion (portion where the seal fin is provided) flows not only with an axial (flow direction) velocity component but also with a circumferential velocity component (hereinafter, a flow in a circumferential direction is referred to as "swirling flow"), and the seal excitation force is generated by the swirling flow.

In other words, when the rotating structure is infinitesimally displaced (eccentric) in a radial direction, a portion where a flow channel between the rotating structure and the seal fin is narrowed to increase a static pressure and a portion where the flow channel is widened to decrease the static pressure are generated, and a phase difference occurs in a static pressure distribution between an upstream side and a downstream side of the seal fin due to the swirling flow of the leaked working fluid. As a result, the force generated due to the non-uniformity of the static pressure acts on a rotating body to generate the seal excitation force.

As a technology for suppressing the unstable vibrations of the turbine, there is a technology disclosed in Patent Literature 2. Hereinafter, the technology disclosed in Patent Literature 2 will be described. In the description, for reference, reference numerals used in Patent Literature 2 are illustrated in parentheses.

In the technology disclosed in Patent Literature 2, a plurality of seal fins (42) are provided along a rotor axial, center line direction (L) so as to face shrouds (12) provided at tops of rotor blades (11), and seal rings (41) to which the seal fins (42) are attached are provided with groove portions (43) having the same depth (D2) between each of the seal fins (42). The depth (D2) of the groove portions (43) is set to the extent that the groove portions (43) do not lower strength to support the seal fins (42). Patent Literature 2 asserts that, by providing the groove portions (43), it is possible to substantially increase a space between the seal fins (42) as compared with the case of the conventional seal structure without the groove portions in the steam turbine and to suppress an occurrence of steam whirl (unstable vibrations) (refer to paragraphs [0025] to [0028], FIG. 4 and the like).

CITATION LIST

Patent Literature

Patent Literature 1: JP 2011-208602 A
Patent Literature 2: JP 2013-076341 A

SUMMARY OF INVENTION

Technical Problem

However, in the technology disclosed in Patent Literature 2, the depth (D2) of the groove portions (43) is limited to the extent that the groove portions (43) do not lower the strength to support the seal fins (42). For this reason, the range in which the space between the seal fins 42 is able to be substantially enlarged and the effect of suppressing the occurrence of the unstable vibrations are also limited.

The present invention has been made in view of the above problems, and it is an object of the present invention to provide a seal structure and a turbomachine which are capable of effectively suppressing unstable vibrations.

Solution to Problem (1) To achieve the above object, a seal structure according to the present invention is to suppress a leak flow of a working fluid from a gap between a rotating structure and a stationary structure, the rotating structure being configured to rotate in a prescribed direction about an axial center line, the stationary structure facing an outer periphery of the rotating structure in a radial direction with the gap inbetween, wherein the stationary structure has a cavity in which the rotating structure is accommodated, an inner peripheral surface of the cavity is provided with a seal fin that extends toward the axial center line and a plurality of stationary-side recesses arranged along a flow direction of the leak flow, and as compared with a first stationary-side recess disposed on a most upstream side in the flow direction, a second stationary-side recess disposed on an immediately downstream side of the first stationary-side recess in the flow direction is set to have a smaller depth dimension.

(2) It is preferable that the stationary structure is a turbine casing, the rotating structure is a plurality of tip shrouds that are provided along an axial direction and are attached to tips of rotor blades, and the seal fins are disposed to face the tip shrouds in the radial direction.

(3) It is preferable that three or more stationary-side recesses are provided along the flow direction, and the depth dimensions are set to be smaller toward the downstream side in the flow direction.

(4) It is preferable that a plurality of the seal fins are provided along the flow direction, and the first stationary-side recess is provided between a first seal fin disposed on a most upstream side in the flow direction and a second seal fin disposed on an immediately downstream side of the first seal fin in the flow direction.

(5) It is preferable that the depth dimension of the first stationary-side recess is set to be greater than double of a pitch between the first seal fin and the second seal fin.

(6) It is preferable that the pitches between the seal fins are set to be equal to each other.

(7) It is preferable that at least one of the seal fins is provided at a prescribed distance in an axial direction from the adjacent stationary-side recess.

(8) It is preferable that at least one of the first stationary-side recess and the second stationary-side recess extends in the radial direction.

(9) It is preferable that at least one of the stationary-side recesses is consecutively connected to an axial recess that extends in an axial direction.

(10) It is preferable that the stationary-side recess is provided between the seal fins, and a total dimension of the stationary-side recess and the axial recess as a dimension in the axial direction is set to be greater than a pitch between the seal fins.

(11) It is preferable that a rotating-side recess is provided in the rotating structure so as to face the stationary-side recess, and as the rotating-side recess, at least one of a first rotating-side recess that faces the first stationary-side recess and a second rotating-side recess that faces the second stationary-side recess is provided.

(12) It is preferable that the rotating structure is provided with the first rotating-side recess and the second rotating-side recess, and a distance between a bottom surface of the second stationary-side recess and a bottom surface of the second rotating-side recess is set to be shorter than a distance between a bottom surface of the first stationary-side recess and a bottom surface of the first rotating-side recess.

(13) To achieve the above object, a turbomachine according to the present invention includes: a rotating structure configured to rotate in a prescribed direction about an axial center line; a stationary structure that faces an outer periphery of the rotating structure in a radial direction with a gap inbetween; and the seal structure according to any one of (1) to (12).

(14) It is preferable that as the rotating structure, a plurality of tip shrouds are provided in the axial direction, and as the stationary structure, a turbine casing surrounding the plurality of tip shrouds is provided, and the turbomachine is a turbine having the seal structure applied to at least one tip shroud among the plurality of tip shrouds.

(15) It is preferable that the at least one tip shroud is disposed closest to an inlet of the working fluid.

(16) It is preferable that the at least one tip shroud is disposed at a center in an axial direction.

Advantageous Effects of Invention

In the present invention, the inner peripheral surface of the cavity of the stationary structure in which the rotating structure and the seal fin are accommodated is provided with, as the stationary-side recess for alleviating the non-uniformity of the static pressure distribution, the first stationary-side recess and the second stationary-side recess in order from the upstream side, and the depth dimension of the second stationary-side recess is set to be smaller than that of the first stationary-side recess.

Rather than setting the depth dimensions of the first stationary-side recess and the second stationary-side recess to be the same, by setting the depth dimension of the second stationary-side recess, which is disposed on the downstream side where the non-uniformity is lower, to be smaller, the decrease in the strength of the stationary structure is suppressed, and thus, it is possible to set the depth dimension of the first stationary-side recess, which is disposed on the upstream side where the non-uniformity is high, to be large while securing the strength of the stationary structure.

Therefore, according to the present invention, it is possible to effectively suppress the unstable vibrations while suppressing the decrease in the strength of the stationary structure due to the presence of the recesses.

DESCRIPTION OF EMBODIMENTS

Embodiments of the present invention will be described below with reference to the drawings.

In the present embodiment, an example in which a seal structure and a turbomachine of the present invention are applied to a steam turbine will be described.

It is to be noted that each of the following embodiments is merely an example, and there is no intention to exclude applications of various modifications and technologies not explicitly described in each of the following embodiments. Each configuration of each of the following embodiments may be variously modified without departing from the purpose thereof, optionally selected as appropriate, or combined appropriately.

In the following description, the terms "upstream" and "downstream" respectively mean upstream and downstream with regard to a flow component in an axial direction A of a leak steam SL unless otherwise specified. That is, the left side in FIGS. 1 to 4 is defined as an upstream side, and the right side is defined as a downstream side.

Further, a direction toward a rotor axial center line (hereinafter, also referred to as "axial center line") CL of a steam turbine is defined as an inner periphery side or an inner side, and an opposite side thereto, i.e., a direction going away from the axial center line CL is described as an outer periphery side or an outer side.

In addition, in the following description, a peripheral direction means a circumferential direction centered on the axial center line CL unless otherwise specified.

[1. First Embodiment]
[1-1. Overall Configuration of Steam Turbine]

A steam turbine 1 of a first embodiment will be described with reference to FIG. 1.

Figure 1:
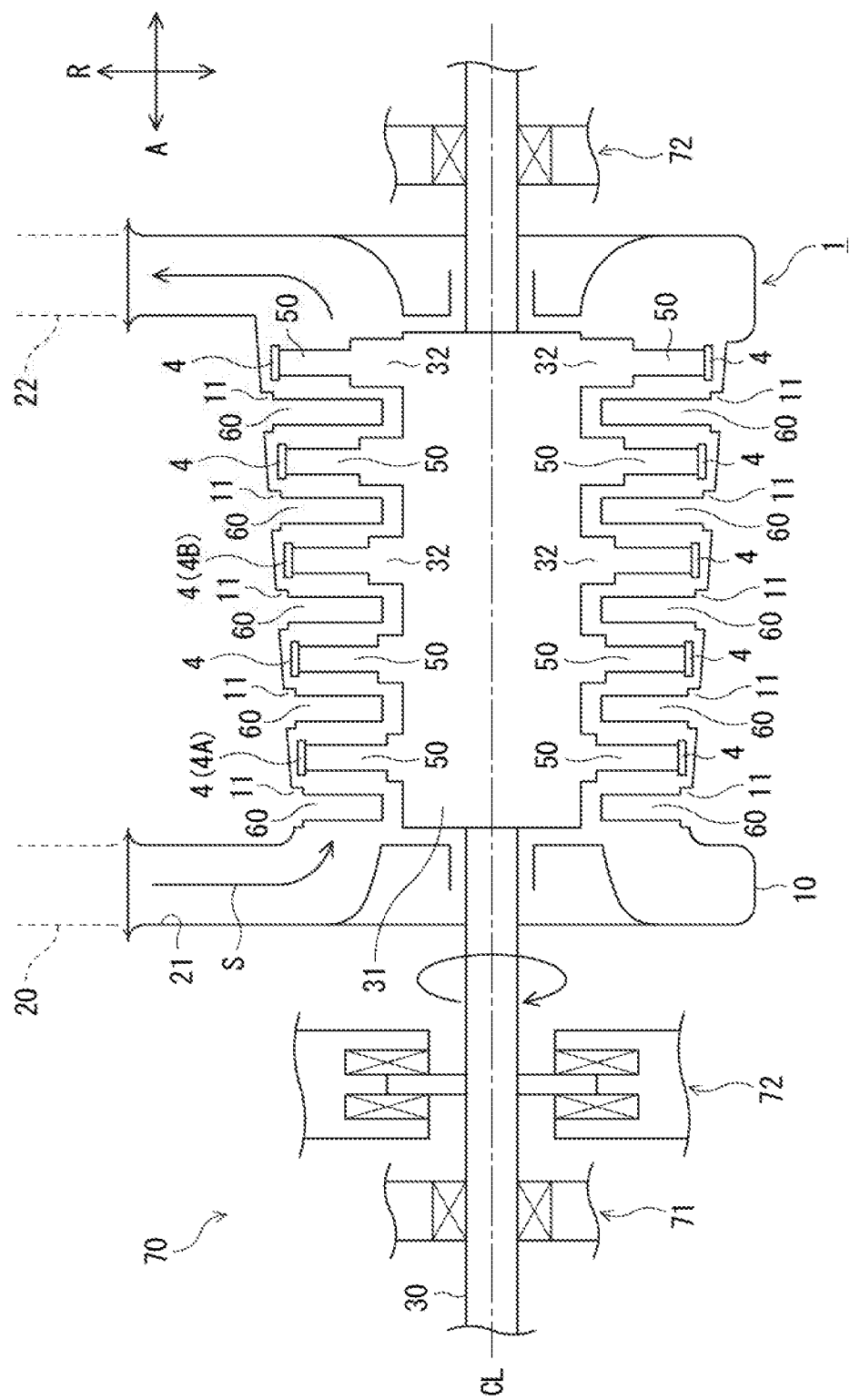
FIG. 1 is a schematic longitudinal cross-sectional view illustrating the overall configuration of a steam turbine according to each embodiment of the present invention.

As illustrated in FIG. 1, the steam turbine 1 of the first embodiment is configured to include a turbine casing (stationary structure, hereinafter also referred to as a "casing") 10, a rotor shaft 30 that is rotatably installed inside the casing 10 and transmits power to non-illustrated machines such as a generator, stator blades 60 provided to the casing 10, rotor blades 50 provided on the rotor shaft 30, and a bearing unit 70 that rotatably supports the rotor shaft 30 about an axial center line CL. The stator blade 60 and the rotor blade 50 are blades extending in a radial direction R of the rotor shaft 30.

The casing 10 is stationary, whereas the rotor blades 50 rotate about the axial center line CL. That is, the casing 10 and the rotor blades 50 (including tip shrouds 4 to be described below) rotate relative to each other.

An internal space of the casing 10 is hermetically sealed and forms a flow channel for steam (fluid) S. The steam S is introduced from a main flow inlet 21 formed in the casing 10 through a steam supply pipe 20 connected to a steam supply source (not illustrated), and is discharged from a steam discharge pipe 22 connected to a downstream side of the steam turbine 1.

In addition, ring-shaped partition plate outer rings 11 are firmly fixed to an inner wall surface of the casing 10.

The bearing unit 70 includes a journal bearing device 71 and thrust bearing devices 72, and rotatably supports the rotor shaft 30.

The stator blades 60 extend from the casing 10 to an inner periphery side and are radially arranged so as to surround the rotor shaft 30, thereby constituting annular stator blade groups and each of the stator blades 60 is held by the above-described partition plate outer ring 11.

The annular stator blade groups constituted by the plurality of stator blades 60 are formed at intervals in the axial direction A of the rotor shaft 30, and convert pressure energy of the steam S into velocity energy to introduce the steam S into the rotor blades 50 adjacent to a downstream side thereof.

The rotor blades 50 are firmly attached to disks 32 formed on an outer peripheral part of a rotor shaft body 31 of the rotor shaft 30 and are radially arranged on the downstream sides of the respective annular stator blade groups, thereby constituting annular rotor blade groups.

The annular stator blade groups and the annular rotor blade groups are in a one-set one-stage form. Tip parts of the plurality of rotor blades 50 constituting each rotor blade group are connected by a ring-shaped tip shroud (rotating structure) 4.

[1-2. Seal Structure]

The seal structure of the first embodiment will be described with reference to FIG. 2.

Figure 2:
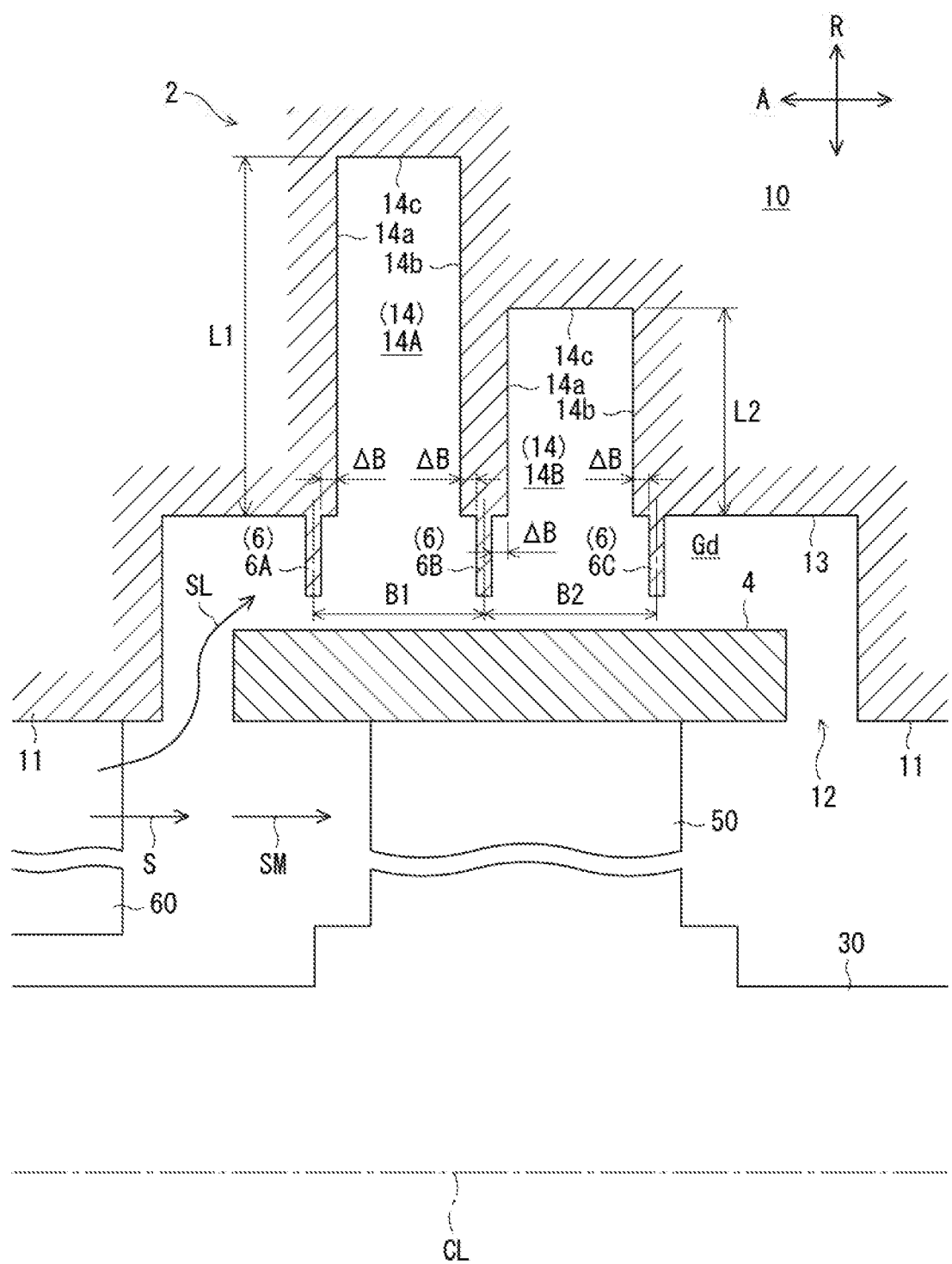
FIG. 2 is a schematic cross-sectional view of a configuration of a seal structure according to a first embodiment of the present invention taken along a radial direction.

As illustrated in FIG. 2, cavities 12 recessed from the inner peripheral surfaces of the partition plate outer rings 11 are formed between each of the plurality of partition plate outer rings 11. The cavity 12 is an annular space centered on the axial center line CL and has a bottom surface defined by the inner peripheral surface (hereinafter, also referred to as a "cavity bottom surface") 13 of the casing 10.

The cavity 12 accommodates the tip shroud 4, and the cavity bottom surface 13 faces the tip shroud 4 in the radial direction R via a gap Gd.

Most part SM of the steam S is introduced into the rotor blades 50 and the energy of the steam S is converted into rotational energy, so that the rotor shaft 30 is rotated. On the other hand, a flow (leak flow, hereinafter also referred to as "leak steam") SL of a part (for example, about several %) of the steam S leaks into the gap Gd without being introduced into the rotor blades 50. Since the energy of the leak steam SL is not converted into the rotational energy, the leak steam SL brings about a leak loss that reduces the efficiency of the steam turbine 1.

In view of this, in each of the gaps Gd between the casing 10 and the tip shrouds 4, the seal structure 2 according to the first embodiment of the present invention is provided. In other words, each of the seal structures 2 according to the first embodiment of the present invention is provided for each tip shroud 4.

Hereinafter, the seal structure 2 will be described.

The tip shroud 4 is in a ring shape as described above, and has a constant rectangular transverse cross-sectional shape elongated in the axial direction A over the entire circumference as illustrated in FIG. 2.

Seal fins 6A, 6B, and 6C (not illustrated in FIG. 1) extending to the inner periphery side toward the tip shroud 4 are provided on the cavity bottom surface 13. These seal fins 6A, 6B, and 6C are set to have the same shape, are in a ring shape centered on the axial center line CL, and have a constant rectangular transverse cross-sectional shape elongated in the radial direction R over the entire circumference as illustrated in FIG. 2.

Further, the seal fins 6A, 6B, and 6C are disposed at prescribed pitches B1 and B2 along the axial direction A, and in the first embodiment, the pitch B1 between the seal fin 6A and the seal fin 6B and the pitch B2 between the seal fin 6B and the seal fin 6C are set to have the same dimensions (B1=B2). That is, the seal fins 6A, 6B, and 6C are disposed at equal pitches.

The pitches B1 and B2 described herein refer to mutual distances of the center lines in a thickness direction (in other words, the axial direction A) of the seal fins 6A, 6B, and 6C.

Hereinafter, when the seal fins 6A, 6B, and 6C are not distinguished from one another, each of them is referred to as a seal fin 6.

It is to be noted that the seal fins 6A, 6B, and 6C do not have to be in the same shape, and may be in different shapes.

On the cavity bottom surface 13, casing recesses (hereinafter also referred to as "recess" or "radial recess") 14A and 14B extending in the radial direction R toward the outer periphery side are provided between each of the seal fins 6A, 6B, and 6C. Hereinafter, when the recesses 14A and 14B are not distinguished from each other, each of them is referred to as a recess 14. In the first embodiment, the recess 14 is a ring-shaped recess formed over the entire circumference of the cavity bottom surface 13 and centered on the axial center line CL, and is defined by ring-shaped side surfaces 14a and 14b facing each other and having widths in the radial direction R and a ring-shaped bottom surface 14c connecting outer peripheral edges of the side surfaces 14a and 14b to each other and having a width in the axial direction A.

The recess 14 is set to be shallower as it goes toward the downstream side, and a depth dimension L2 of the recess 14B on the downstream side is set to be smaller (shallower) than a depth dimension L1 of the recess 14A on the upstream side (L2<L1).

Here, the cavity bottom surface 13 and the bottom surfaces 14c defining the respective recesses 14A and 14B are circumferential surfaces centered on the axial center line CL, and the depths L1 and L2 of the recesses 14A and 14B correspond to distances in the radial direction R between the cavity bottom surface 13 and the bottom surfaces 14c.

In addition, each recess 14 is formed at a prescribed distance ΔB (ΔB>0) with respect to the adjacent seal fins 6 in the axial direction A.

[1-3. Action and Effect]

The action and effect of the seal structure 2 according to the first embodiment of the present invention will be described with reference to FIG. 2.

As described in the section "Technical Problem", the static pressure distribution around the cavity bottom surface 13 and the tip shroud 4 may become non-uniform with respect to the circumferential direction. However, since the recesses 14A and 14B are provided on the cavity bottom surface 13, the gap Gd is substantially enlarged, so that it is possible to alleviate variations in the static pressure distribution in the circumferential direction. In other words, the recesses 14A and 14B have a function as an absorber (hereinafter, referred to as an "absorber function") that alleviates the non-uniformity (unevenness) of the static pressure distribution.

Further, the non-uniformity of the static pressure distribution tends to be larger toward the upstream side and smaller toward the downstream side. Therefore, in the seal structure 2, on the upstream side where the non-uniformity of the static pressure distribution is relatively large, the recess 14A having relatively large depth dimension and volume (relatively high absorber function) is provided, and on the downstream side where the non-uniformity of the static pressure distribution is relatively small, the recess 14B having relatively small depth dimension and volume (relatively low absorber function) is provided.

Deeper recesses 14A and 14B achieve better absorber function, but lowers the strength of the casing 10, Regarding this, in the seal structure 2, the depth dimension L2 of the recess 14B is set to be small on the downstream side where the non-uniformity of the static pressure distribution is low, thereby suppressing the strength of the casing 10 from being reduced unnecessarily. As the depth dimension L2 of the recess 14B is small, the depth dimension L1 of the recess 14A is set to be large on the upstream side where the non-uniformity of the static pressure distribution is high, so that it is possible to improve the absorber function.

Therefore, it is possible to effectively suppress the unstable vibrations of the turbine while suppressing the decrease in strength of the casing 10, as compared with the case in which the depth dimensions L1 and L2 of the recesses 14A and 14B are set to be the same size.

Further, the depth dimension L1 of the recess 14A between the seal fin 6A and the seal fin 6B, that is, the recess 14A on the most upstream side is set to be greater than double of the pitch B1 between the seal fin 6A and the seal fin 6B (L1>B1×2), so that it is possible to further effectively improve the uniformity of the static pressure distribution and suppress the unstable vibrations of the turbine.

In addition, each recess 14 is formed at a prescribed distance ΔB (ΔB>0) with respect to the adjacent seal fins 6 in the axial direction A. In other words, in each of, the seal fins 6 a support portion that supports a root portion (the portion connecting the seal fin 6 and the cavity bottom surface 13) is for med over the prescribed distance ΔB from the recess 14. Therefore, as compared with the case where the seal fin 6 is provided to be flush with the side surface 14a or the side surface 14b of the recess 14 (ΔB=0), it is possible to improve the strength of the root of the seal fin 6.

[2. Second Embodiment]

Figure 3:
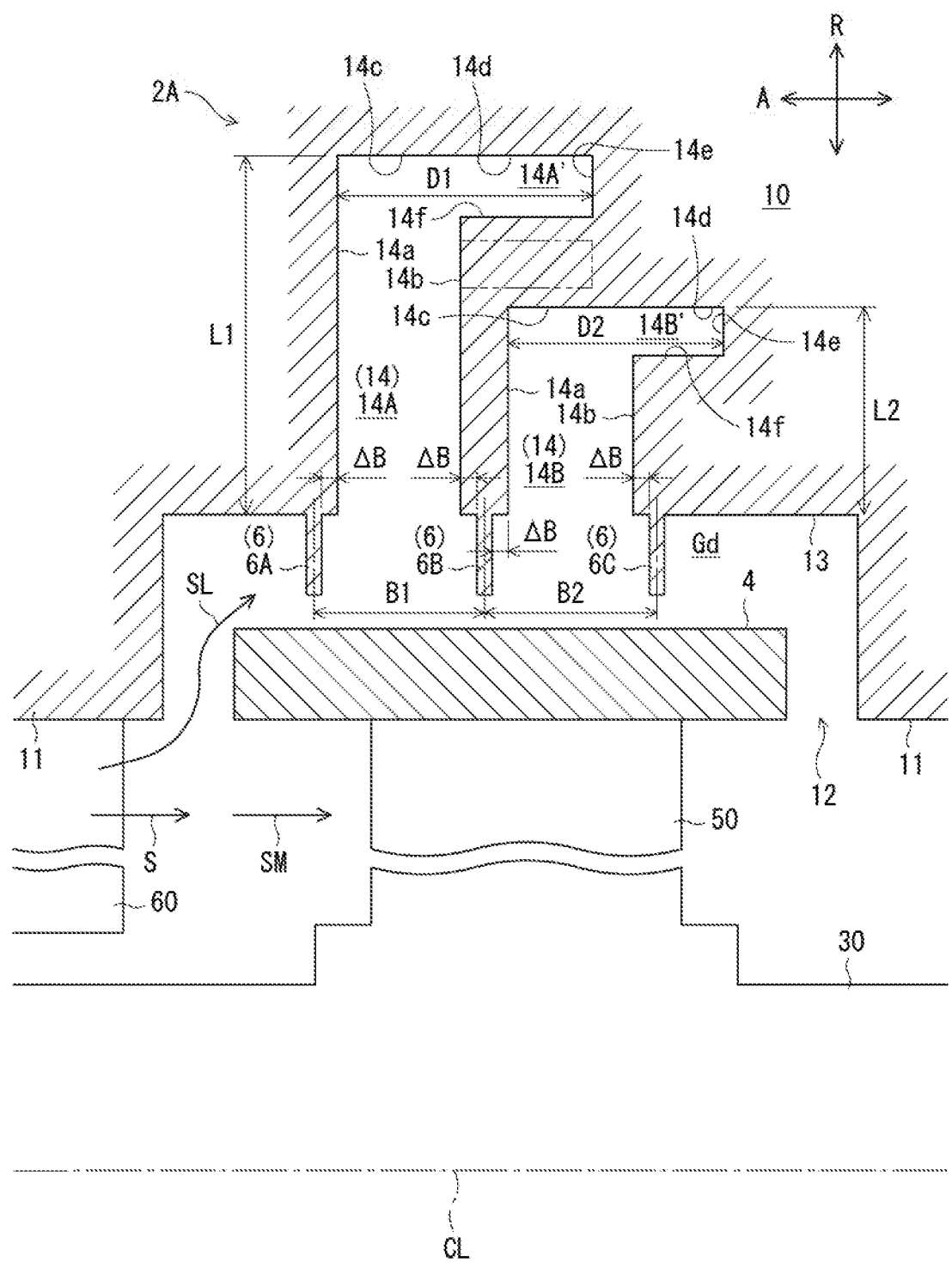
FIG. 3 is a schematic cross-sectional view of a configuration of a seal structure according to a second embodiment of the present invention taken along a radial direction.

Hereinafter, a second embodiment of the present invention will be described with reference to FIG. 3. It is to be noted that the same elements as those of the first embodiment are denoted by the same reference numerals, and a description thereof will be omitted.

[2-1. Seal Structure]

As compared with the seal structure 2 of the first embodiment illustrated in FIG. 2, in a seal structure 2A according to the second embodiment of the present invention, an axial recess 14A' extending in the axial direction A from an outer peripheral end of the radial recess 14A toward the downstream side is consecutively connected to the radial recess 14A, and an axial recess 14B' extending in the axial direction A from an outer peripheral end of the radial recess 14B toward the downstream side is consecutively connected to the radial recess 14B.

The axial recesses 14A' and 14B' are recesses that open on the radial recesses 14A and 14B sides and are formed in a ring shape centered on the axial center line CL. Each of the axial recesses 14A' and 14B' is defined by an outer peripheral bottom surface 14d, an inner peripheral bottom surface 14f, and a side surface 14e. The outer peripheral bottom surface 14d and the inner peripheral bottom surface 14f are ring-shaped surfaces that face each other and each have a width in the axial direction A. Further, the outer peripheral bottom surface 14d is formed to be flush with the bottom surface 14c of the radial recess 14. The side surface 14e is a ring-shaped surface that connects downstream edges of these bottom surfaces 14d and 14f and has a width in the radial direction R.

It is possible to substantially enlarge the radial recess 14A by providing the axial recess 14A', and in the second embodiment, a total axial dimension D1 of the radial recess 14A and the axial recess 14A' is set to be greater than the pitch B1 between the fins 6A and 6B (D1>B1). Similarly, it is possible to substantially enlarge the radial recess 14B by providing the axial recess 14B', and in the second embodiment, a total axial dimension D2 of the radial recess 14B and the axial recess 14B' is set to be greater than the pitch B2 between the fins 6B and 6C (D2>B2).

Since other structures are the same as those of the seal structure 2 of the first embodiment, a description thereof is omitted.

[2-2. Action and Effect]

According to the second embodiment of the present invention, it is possible to increase the volume of the recess to alleviate the non-uniformity (unevenness) of the static pressure distribution by providing the axial recesses 14A' and 14B' in addition to the radial recesses 14A and 14B, and as a result it is possible to more effectively suppress the unstable vibrations of the turbine as compared with the first embodiment.

In particular, with only the radial recesses 14A and 14B extending in the radial direction R between the seal fins 6A, 68, and BC, it is impossible to make the dimension in the axial direction A greater than the pitches B1 and B2 of the seal fins 6A, 6B, and 6C. However, by providing the axial recesses 14A' and 14B', it is possible to partially make the dimension in the axial direction A of the radial recesses 14A and 14B longer than the pitches B1 or B2.

Further, since the radial recess 14B on the downstream side is formed to be shallower than the radial recess 14A on the upstream side, an empty space is formed on the downstream side of the outer peripheral part of the radial recess 14A. By using this empty space, it is possible to form the axial recess 14A' on the downstream side of the outer peripheral part of the radial recess 14A and efficiently dispose the recesses.

[2-3. Others]

(1) In the second embodiment, the axial recesses 14A' and 14B' are provided to the respective outer peripheral ends of the radial recesses 14A and 14B, but the axial recesses 14A' and 14B' do not have to be provided to the outer peripheral ends of the radial recesses 14A and 14B. For example, as shown by a two-dot chain line in FIG. 3, the axial recess 14A' may be connected to an intermediate part in the radial direction R of the radial recess 14A.

(2) In the second embodiment, the downstream sides of the radial recesses 14A and 14B are provided with the axial recesses 14A' and 14B' respectively, but the upstream sides of the radial recesses 14A and 14B may be provided with the axial recesses 14A' and 14B', respectively.

[3. Third Embodiment]

Figure 4:
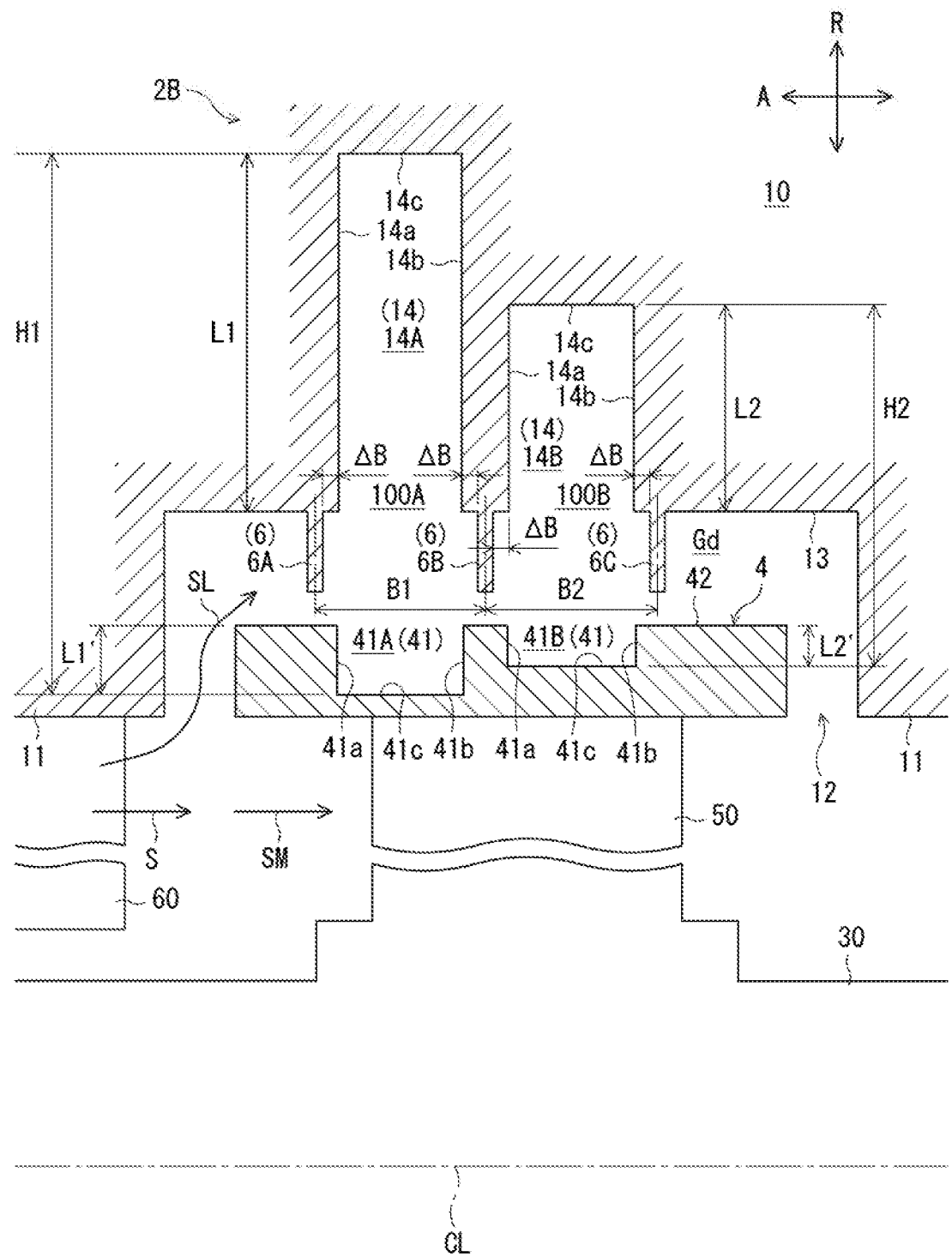
FIG. 4 is a schematic cross-sectional view of a configuration of a seal structure according to a third embodiment of the present invention taken along a radial direction.

Hereinafter, a third embodiment of the present invention will be described with reference to FIG. 4. It is to be noted that the same elements as those of the first embodiment are denoted by the same reference numerals, and a description thereof will be omitted.

[3-1. Seal Structure]

A seal structure 2B of the third embodiment of the present invention is different from the seal structure 2 of the first embodiment illustrated in FIG. 2 in that shroud recesses (hereinafter, also referred to as a "recess") 41A and 41B formed on a tip shroud 4 are added. The shroud recess 41A (first rotating-side recess) is disposed to face the casing recess 14A, and the shroud recess 41B (second rotating-side recess) is disposed to face the casing recess 14B. Hereinafter, when the recesses 41A and 41B are not distinguished from each other, each of them is referred to as a recess 41.

In the third embodiment, the recess 41 is a ring-shaped recess formed over the entire circumference of an outer peripheral surface 42 of the shroud 4 and centered on the axial center line CL. The recess 41 is recessed toward the inner periphery side from the outer peripheral surface of the tip shroud 4 (that is, the recess 41 extends along the radial direction R), and is defined by ring-shaped side surfaces 41a and 41b facing each other and having widths in the radial direction R, and a ring-shaped bottom surface 41c connecting inner peripheral edges of the side surfaces 41a and 41b and having a width in the axial direction A.

As described above, the depth dimension L2 of the casing recess 14B disposed to face the shroud recess 41B is set to be smaller than the depth dimension L1 of the casing recess 14A disposed to face the shroud recess 41A. In addition, a depth dimension L2' of the shroud recess 41B on the downstream side is set to be smaller (shallower) than a depth dimension L1' of the shroud recess 41A on the upstream side (L2'<L1').

Therefore, a height dimension (that is, a distance between "the bottom surface 14c of the casing recess 14B" and "the bottom surface 41c of the shroud recess 41B") H2 of a space 100B between the recesses 14B and 41B is set to be smaller than a height dimension (that is, a distance between "the bottom surface 14c of the casing recess 14A" and "the bottom surface 41c of the shroud recess 41A") H1 of a space 100A between the recesses 14A and 41A (H1>H2).

The spaces 100A and 100B substantially enlarge the gap Gd between the cavity bottom surface 13 and the tip shroud 4 to alleviate the non-uniformity of the static pressure distribution, and similar to the first embodiment, the large space 100A is provided on the upstream side where the non-uniformity is relatively high and the small space 100B is provided on the downstream side where the non-uniformity is relatively low. Hereinafter, when the space 100A and the space 100B are not distinguished from each other, each of them is referred to as a space 100.

Here, each of the outer peripheral surface 42 of the shroud 4 and the bottom surfaces 41c respectively defining the recesses 41A and 41B is a circumferential surface centered on the axial center line CL, and the depths L1' and L2' of the respective shroud recesses 41A and 41B correspond to distances in the radial direction R between the bottom surfaces 41c and the outer peripheral surface 42 of the tip shroud 4. In addition, the height dimension H1 corresponds to a distance in the radial direction R between the bottom surface 14c of the casing recess 14 A and the bottom surface 41c of the shroud recess 41A, and the height dimension H2 corresponds to a distance in the radial direction R between the bottom surface 14c of the casing recess 14B and the bottom surface 41c of the shroud recess 41B.

[3-2. Action and Effect]

According to the third embodiment of the present invention, the shroud recess 41 is provided in addition to the casing recess 14, and the space 100 formed between the recesses 14 and 41 is set to be smaller toward the downstream side, so that it is possible to further suppress the unstable vibrations of the turbine while suppressing the decrease in strength of the casing 10 as compared with the first embodiment.

[3-3. Others]

(1) In the third embodiment, the depth dimension L2' of the shroud recess 41B is set to be smaller than the depth dimension L1' of the shroud recess 41A, but if the height dimension H2 of the space 100B on the downstream side is smaller than the height dimension H1 of the space 100A on the upstream side, the depth dimension L2' does not have to be set to be smaller than the depth dimension L1'. For example, in the third embodiment, the depth dimension L1' and the depth dimension L2' may be set to be the same dimension.

(2) In the third embodiment, the casing recess 14 and the shroud recess 41 disposed to face the casing recess 14 are provided as one set, and two sets are provided for one tip shroud 4, but three or more sets may be provided for one tip shroud 4. In this case, the height dimension of the space 100 formed between the casing recess 14 and the shroud recess 41 is preferably reduced toward the downstream side. However, as long as the height dimension H2 of the second space 100B from the upstream side is smaller than the height dimension H1 of the space 100A on the most upstream side, the height dimensions are not limited to the above. For example, the height dimension H2 of the second space 100B from the upstream side and height dimensions of the third and subsequent spaces (between the recess 14 and the recess 41) from the upstream side may be set to the same dimension.

(3) Also in the third embodiment, similar to the second embodiment, an axial recess may be provided to at least one of the recess 14A and the recess 14B.

[4. Others]

(1) In each of the above-described embodiments, three seal fins 6 are provided for each tip shroud 4 and a total of two casing recesses 14 are provided between each of the seal fins 6. However, the number of the seal fins 6 and the number of the casing recesses 14 that are provided for one tip shroud 4 are not limited to these numbers. In the case in which three or more casing recesses 14 are provided for one tip shroud 4, the depth dimension of the casing recess 14 is preferably set to be shorter as the casing recess goes to the downstream side, but the depth dimension of the casing recess 14 is not limited to this as long as the depth dimension L2 of the second casing recess 14B from the upstream side is smaller than the depth dimension L1 of the casing recess 14A on the most upstream side. For example, the depth dimension of the second casing recess 14 from the upstream side and the depth dimensions of the third and subsequent casing recesses 14 from the upstream side may be set to the same dimension.

(2) In the steam turbine of each of the above embodiments, the seal structure of the present invention is applied to each tip shroud 4, but the seal structure of the present invention may be applied to only some (at least one) of, the tip shrouds 4.

In the case in which the seal structure of the present invention is applied to some of the tip shrouds 4, the sealing structure of the present invention is preferably applied to the tip shroud 4A (refer to FIG. 1) closest to the main flow inlet 21 that is the inlet of the steam S (in other words, the tip shroud 4A on the highest pressure side) since the non-uniformity of the static pressure is maximized at the area.

Alternatively, when the unstable vibrations occur in a primary mode of the rotor shaft 30, the amplitude is maximized at the center in the axial direction A, so that the seal structure of the present invention is preferably applied to the tip shroud 4B (refer to FIG. 1) at the center in the axial direction A.

When the steam turbine is supplied with steam from the center in the axial direction A, the tip shroud at the center in the axial direction A serves as the tip shroud closest to the main flow inlet 21, so that, by applying the seal structure of the present invention to the tip shroud at the center in the axial direction A and closest to the main flow inlet 21, synergistic effects can be obtained.

(3) In the above embodiment, the example in which the present invention is applied to the steam turbine has been described, but the present invention is applicable also to a seal in turbomachines other than a steam turbine, such as a gas turbine and a turbo compressor.

REFERENCE SIGNS LIST

1 Steam turbine (turbomachine)
2, 2A, 2B Seal structure
4 Tip shroud (rotating structure)
4A Tip shroud disposed on most upstream side
4B Tip shroud disposed at center in flow direction of leak steam SL
6, 6A, 6B, 6C Seal fin
10 Turbine casing (stationary structure)
12 Cavity
13 Cavity bottom surface (inner peripheral surface)
14 Casing recess (stationary side recess)
14A Casing recess (first stationary-side recess)
14B Casing recess (second stationary-side recess)
14A', 14B' Axial recess
14a, 14b Side surfaces defining recesses 14, 14A, 14B
14c Bottom surface defining recesses 14, 14A, 14B
14d, 14f Bottom surfaces defining axial recesses 14A', 14B'
14e Side surface defining axial recesses 14A', 14B'
20 Steam supply pipe
21 Main flow inlet
30 Rotor shaft
31 Rotor shaft body
50 Rotor blade
41 Shroud recess
41A Shroud recess (first rotating-side recess)
41B Shroud recess (second rotating-side recess)
42 Outer peripheral surface of shroud 4
60 Stator blade
100, 100A, 100B Space between casing recess 14 and shroud recess 41
A Axial direction
B1 Pitch of seal fins 6A and 6B in axial direction A
D1, D2 Maximum dimension
B2 Pitch of seal fins 6B and 6C in axial direction A
CL Rotor axial center line (axial center line)
Gd Gap
L1 Depth dimension of recess 14A
L2 Depth dimension of recess 14B
R Radial direction
S Steam (working fluid)
SL Leak steam (leak flow)
ΔB Distance between seal fin 6 and recess 14

The invention claimed is:

1. A seal structure to suppress a leak flow of a working fluid from a gap between a rotating structure and a stationary structure, the rotating structure being configured to rotate in a prescribed direction about an axial center line, the stationary structure facing an outer periphery of the rotating structure in a radial direction with the gap in between,
wherein the stationary structure has a cavity in which the rotating structure is accommodated,
an inner peripheral surface of the cavity is provided with a seal fin that extends from the inner peripheral surface toward an inner periphery side and a plurality of stationary-side recesses provided from the inner peripheral surface toward an outer periphery side and arranged along a flow direction of the leak flow, and
as compared with a first stationary-side recess disposed on a most upstream side in the flow direction, a second stationary-side recess disposed on an immediately downstream side of the first stationary-side recess in the flow direction is set to have a smaller depth dimension.

2. The seal structure according to claim 1, wherein the stationary structure is a turbine casing,
the rotating structure is a plurality of tip shrouds that are provided along an axial direction and are attached to tips of rotor blades, and
the seal fins are disposed to face the tip shrouds in the radial direction.

3. The seal structure according to claim 1, wherein three or more stationary-side recesses are provided along the flow direction, and the depth dimensions are set to be smaller toward the downstream side in the flow direction.

4. The seal structure according to claim 1, wherein a plurality of the seal fins are provided along the flow direction, and
the first stationary-side recess is provided between a first seal fin disposed on a most upstream side in the flow direction and a second seal fin disposed on an inmiediately downstream side of the first seal fin in the flow direction.

5. The seal structure according to claim 4, wherein the depth dimension of the first stationary-side recess is set to be greater than double of a pitch between the first seal fin and the second seal fin.

6. The seal structure according to claim 1, Wherein the pitches between the seal fins are set to be equal to each other.

7. The seal structure according to claim 1, Wherein at least one of the seal fins is provided at a prescribed distance in an axial direction from the adjacent stationary-side recess.

8. The seal structure according to claim 1, wherein at least one of the first stationary-side recess and the second stationary-side recess extends in the radial direction.

9. The seal structure according to claim 1, wherein at least one of the stationary-side recesses is consecutively connected to an axial recess that extends in an axial direction.

10. The seal structure according to claim 9, wherein the stationary-side recess is provided between the seal fins, and
a total dimension of the stationary-side recess and the axial recess as a dimension in the axial direction is set to be greater than a pitch between the seal fins.

11. The seal structure according to claim 1, wherein
a rotating-side recess is provided in the rotating structure so as to face the stationary-side recess, and
as the rotating-side recess, at least one of a first rotating-side recess that faces the first stationary-side recess and a second rotating-side recess that faces the second stationary-side recess is provided.

12. The seal structure according to claim 11, wherein
the rotating structure is provided with the first rotating-side recess and the second rotating-side recess, and
a distance between a bottom surface of the second stationary-side recess and a bottom surface of the second rotating-side recess is set to be shorter than a distance between a bottom surface of the first stationary-side recess and a bottom surface of the first rotating-side recess.

13. A turbomachine comprising:
a rotating structure configured to rotate in a prescribed direction about an axial center line;
a stationary structure that faces an outer periphery of the rotating structure in a radial direction with a gap in between; and,
the seal structure according to claim 1.

14. The turbomachine according to claim 13, wherein
as the rotating structure, a plurality of tip shrouds are provided in an axial direction, and as the stationary structure, a turbine casing surrounding the plurality of tip shrouds is provided, and
the turbomachine is a turbine having the seal structure applied to at least one tip shroud among the plurality of tip shrouds.

15. The turbomachine according to claim 14, wherein
the at least one tip shroud is disposed closest to an inlet of the working fluid.

16. The turbomachine according to claim 14, wherein
the at least one tip shroud is disposed at a center in the axial direction.

\* \* \* \* \*